US012802336B2

(12) United States Patent
Reyes Lozano et al.

(10) Patent No.: US 12,802,336 B2
(45) Date of Patent: Nov. 17, 2026

(54) SYSTEM AND METHOD OF BUILDING BVH WITH ORIENTED BOUNDING BOXES

(71) Applicant: Advanced Micro Devices, Inc., Santa Clara, CA (US)

(72) Inventors: Leo Hendrik Reyes Lozano, Santa Clara, CA (US); Alain Hensley Galvan, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 151 days.

(21) Appl. No.: 18/989,872

(22) Filed: Dec. 20, 2024

(65) Prior Publication Data

US 2026/0179307 A1 Jun. 25, 2026

(51) Int. Cl.
*G06T 15/08* (2011.01)
*G06T 15/06* (2011.01)

(52) U.S. Cl.
CPC .............. *G06T 15/08* (2013.01); *G06T 15/06* (2013.01); *G06T 2210/12* (2013.01); *G06T 2210/21* (2013.01)

(58) Field of Classification Search
CPC ..... G06T 15/08; G06T 15/06; G06T 2210/12; G06T 2210/21; G06T 11/20; G06T 17/10; G06T 19/20
See application file for complete search history.

(56) References Cited

U.S. PATENT DOCUMENTS

| | | | | |
|---|---|---|---|---|
| 2014/0362074 A1* | 12/2014 | Karras | G06T 15/06 | |
| | | | 345/419 | |
| 2019/0035138 A1* | 1/2019 | Fuetterling | G06T 15/06 | |
| 2022/0020201 A1* | 1/2022 | Fenney | G06T 15/06 | |
| 2023/0252718 A1* | 8/2023 | Fenney | G06T 1/20 | |
| 2025/0308128 A1* | 10/2025 | Drabinski | G06T 15/005 | |

* cited by examiner

*Primary Examiner* — Xilin Guo
(74) *Attorney, Agent, or Firm* — Volpe Koenig

(57) ABSTRACT

This disclosure describes techniques for generating oriented bounding boxes within a bounding volume hierarchy. A plurality of child nodes are identified having a common parent node in a bounding volume hierarchy. A child node is selected from the plurality of child nodes by identifying a child node having a greatest total surface area. The orientation of the selected child node is applied to at least one further node, wherein the at least one further node includes at least one of another child node from the plurality of child nodes and the parent node. An image is rendered using the bounding volume hierarchy after applying the orientation of the selected child node to the at least one further node.

20 Claims, 19 Drawing Sheets

702

SYSTEM AND METHOD OF BUILDING BVH WITH ORIENTED BOUNDING BOXES

BACKGROUND

In ray tracing, a bounding volume hierarchy (BVH) is used to narrow the candidate primitives for performing an intersection test. Box nodes specify bounding boxes that bound underlying geometry. A failed test against the box node eliminates all children from consideration.

Some BVH structures are comprised of axis-aligned bounding boxes (AABBs) which are aligned with the coordinate axes of a 2D or 3D space. Another type of box node is an oriented bounding box (OBB), that can have rotation with respect to the coordinate axes. Ray tracing performance can be enhanced by using a BVH with OBBs as opposed to AABBs. However, building a BVH to include OBBs is more computationally expensive than exclusively using AABBs. This disclosure addresses the computational costs associated with building BVHs that include OBBs.

BRIEF DESCRIPTION OF THE DRAWINGS

A more detailed understanding may be had from the following description, given by way of example in conjunction with the accompanying drawings wherein.

DETAILED DESCRIPTION

Figure 1:
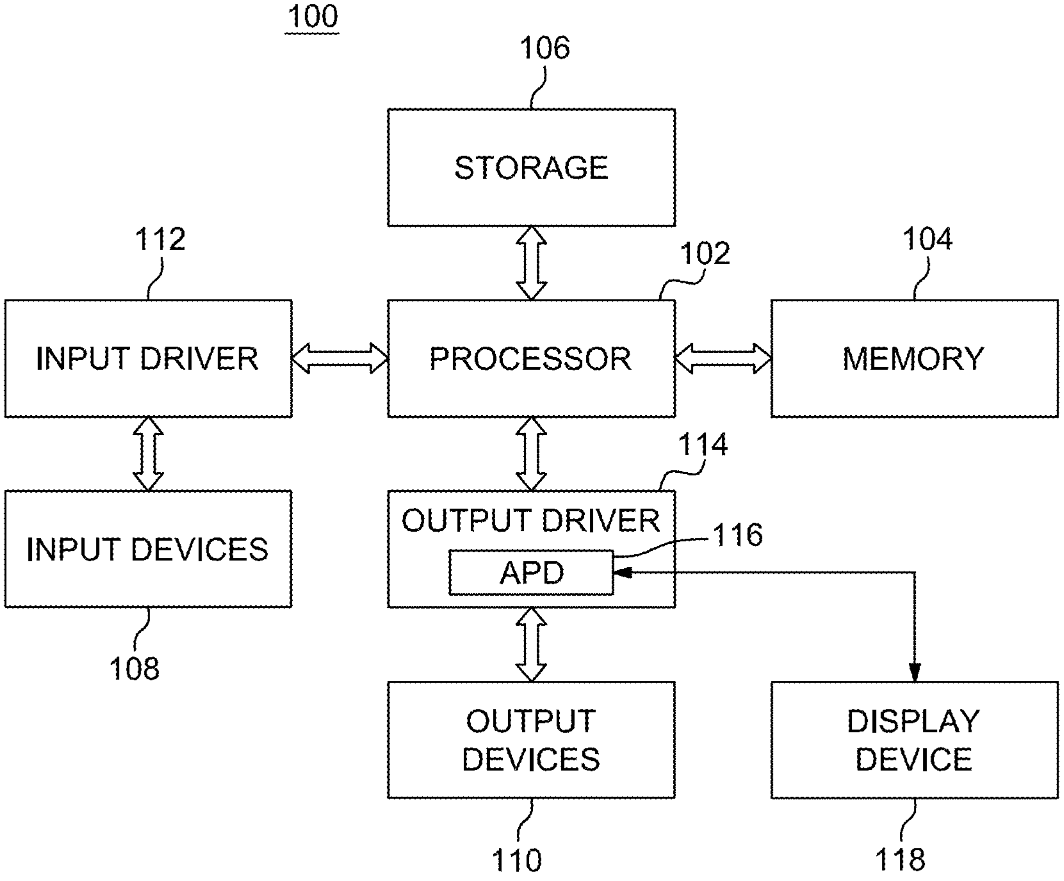
FIG. 1 is a block diagram of an example computing device in which one or more features of the disclosure can be implemented.

This disclosure describes techniques for generating OBBs within a bounding volume hierarchy with improved computational efficiency. Use of OBBs speeds up ray tracing by allowing for orientations other than axis-aligned orientations for bounding volumes. For example, use of such relaxed types of bounding volumes permits the use of tighter boxes around a given geometry, and these tighter boxes in turn speed up ray tracing by preventing "false positive" intersections with bounding volumes. However, computing the orientation for each box node is generally a complex and time-consuming process. The techniques described herein simplify this time-consuming process and result, in some examples, in a process for building a bounding volume hierarchy with OBBs that runs in real time. As described more fully below, these techniques determine orientations for nodes of a BVH in a bottom-up manner. Starting with the bottom level (e.g., leaf nodes), the technique calculates a bounding volume and orientation for each triangle. Then, at each level, the technique selects a node at that level with the largest surface area and propagates its orientation to (i) the parent node, (ii) all or a subset of other siblings of the node, or (iii) a combination of the parent node and all or a subset of other siblings of the node.

As stated above, the technique determines which sibling should propagate its orientation based on the total surface area of the bounding volume of each sibling, with the largest such total surface area having its orientation propagated. In some examples, the bounding volume for which the total surface area is calculated is the oriented bounding volume determined from the lower level (which propagated up) or from a leaf node calculation technique for leaf nodes. In other examples, the bounding volume for which the total surface area is calculated is the axis aligned bounding volume that bounds the geometry of the node (e.g., a bounding volume that is axis aligned and that bounds all geometry of the node). This axis-aligned technique represents an optimization in that the sibling whose orientation gets propagated can be determined without yet knowing that orientation (e.g., before knowing that orientation). The described techniques significantly reduce build time for the OBBs in a bounding volume hierarchy.

In some examples, the techniques described herein identify a plurality of child nodes having a common parent node in a bounding volume hierarchy. A child node is selected from the plurality of child nodes by identifying a child node having a greatest surface area. The orientation of the selected child node is applied to at least one further node, wherein the at least one further node includes at least one of another child node from the plurality of child nodes and the parent node. An image is rendered using the bounding volume hierarchy after applying the orientation of the selected child node to the at least one further node.

In some examples, the techniques described herein are applied to a bounding volume hierarchy includes leaf nodes that are each initially represented by an oriented bounding box, and the plurality of child nodes are ones of those leaf nodes. In some such examples, the orientation for the selected child node is applied to the parent node. In other examples, the plurality of child nodes resulting from the identifying are each initially represented using an axis aligned bounding box in the bounding volume hierarchy. In such other examples, an axis aligned bounding box corresponding to the selected child node is converted to an oriented bounding box by calculating an orientation for the selected child node, and a representation of each other child node from the plurality of child nodes is converted to an oriented bounding box in the bounding volume hierarchy by applying the orientation for the selected child node to the one or more other child nodes.

In some examples where the plurality of child nodes resulting from the identifying are each initially represented using an axis aligned bounding box in the bounding volume hierarchy, a first sum is calculated representing a combined surface area of axis aligned bounding boxes representing the plurality of child nodes, and a second sum is calculated representing a combined surface area of oriented bounding boxes representing the plurality of child nodes. If the difference between the first and second sums exceeds a threshold, the representation of each of the child nodes reverts back to an axis aligned bounding box in the bounding volume hierarchy. In other words, if the determined oriented bounding volume for a node is "worse" (as measured by the total surface area–the sum of surface areas) than the axis aligned bounding box by a particular amount (the threshold), then the oriented bounding volume is discarded for that node and the axis-aligned bounding volume is used instead.

In some examples, the above described processes are applied to each parent node in one level of the bounding volume hierarchy, and then to other levels in the hierarchy until all nodes in the bounding volume hierarchy have been processed. However, the above processes need not be applied to all the nodes in a BVH. In some embodiments, the processes are applied to only a subset of the BVH. In some cases, processing of only the lowest levels (e.g., the four lowest levels) of a BVH occurs. In some examples, various criteria, like a surface area heuristic, is/are used to determine whether (and/or a what level of the BVH) to terminate processing.

Figure 5:
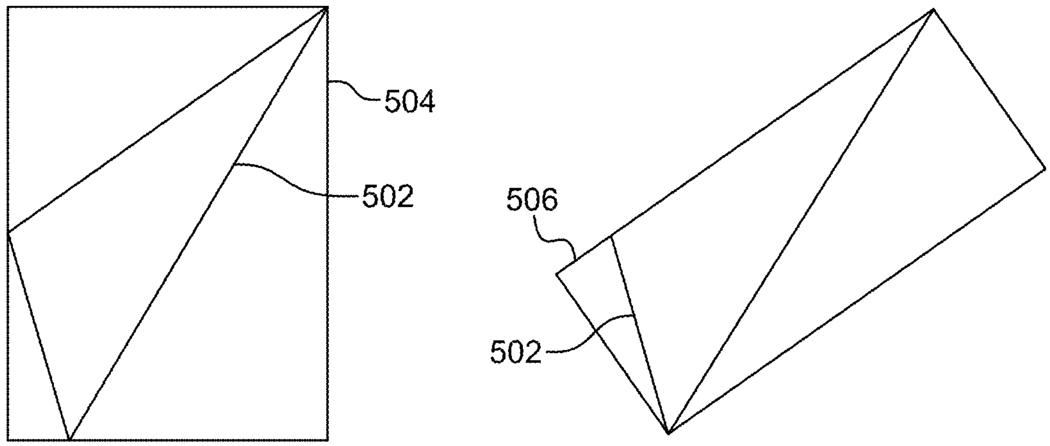
FIG. 5 illustrates an example oriented bounding box.
Figure 6:
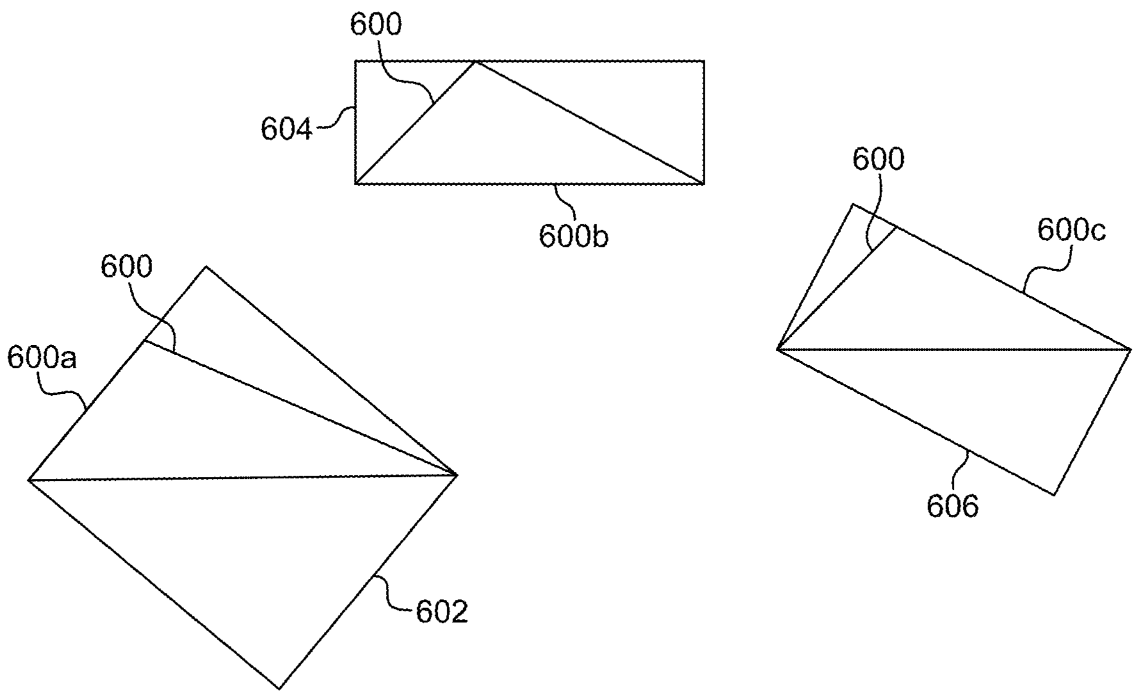
FIG. 6 illustrates a technique for selecting an orientation of a triangle, according to an example.
Figure 7A:
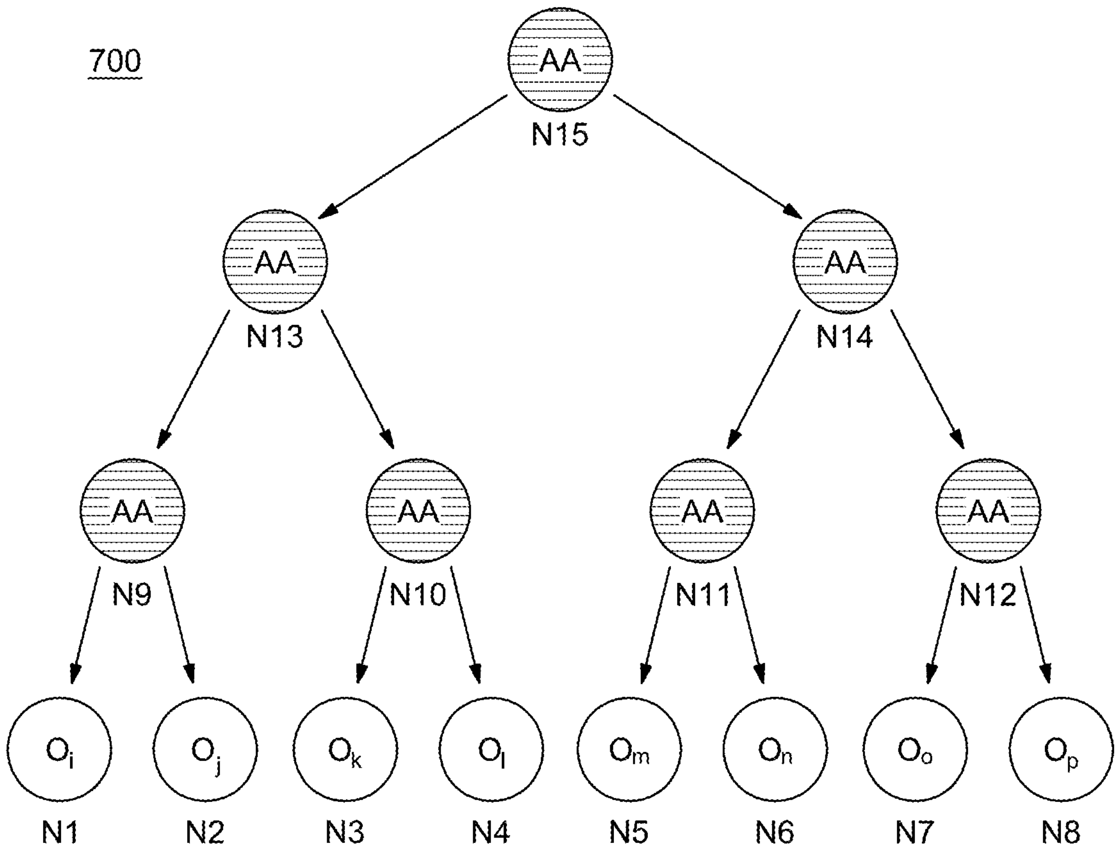
FIGS. 7A-7B illustrate aspects of a technique for building a bounding volume hierarchy with oriented bounding boxes, according to an example.
Figure 7B:
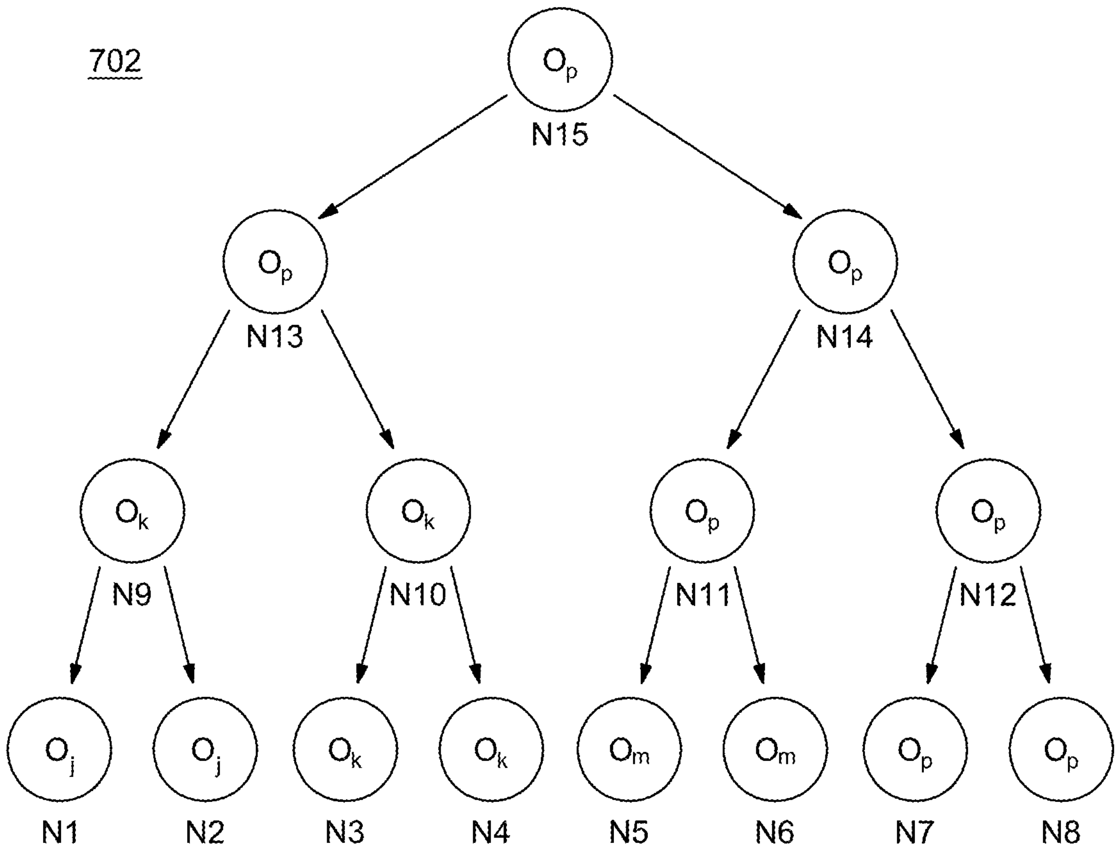
Figure 8:
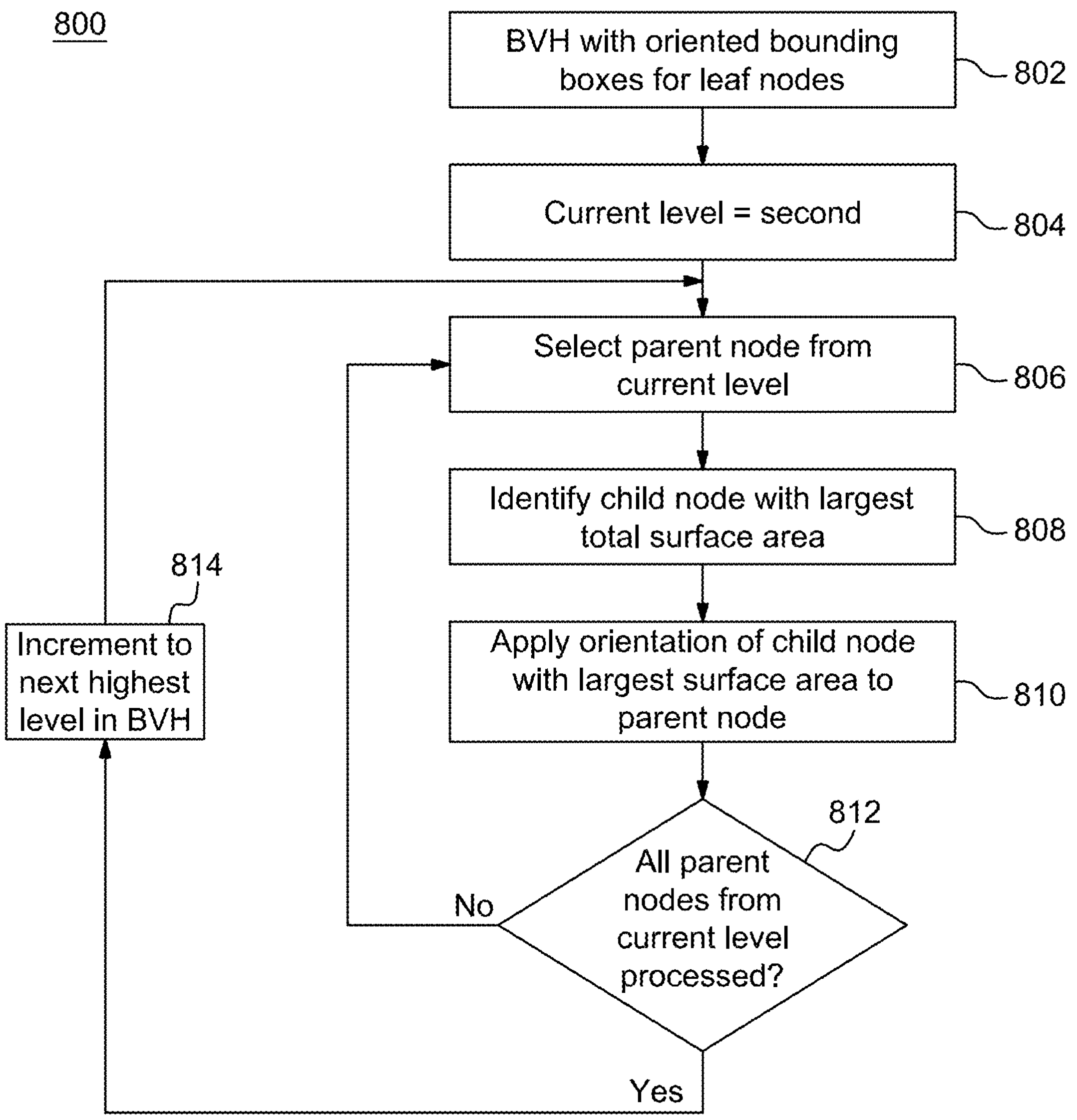
FIG. 8 is a flow diagram illustrating a method for building a bounding volume hierarchy with oriented bounding boxes according to an example.
Figure 10:
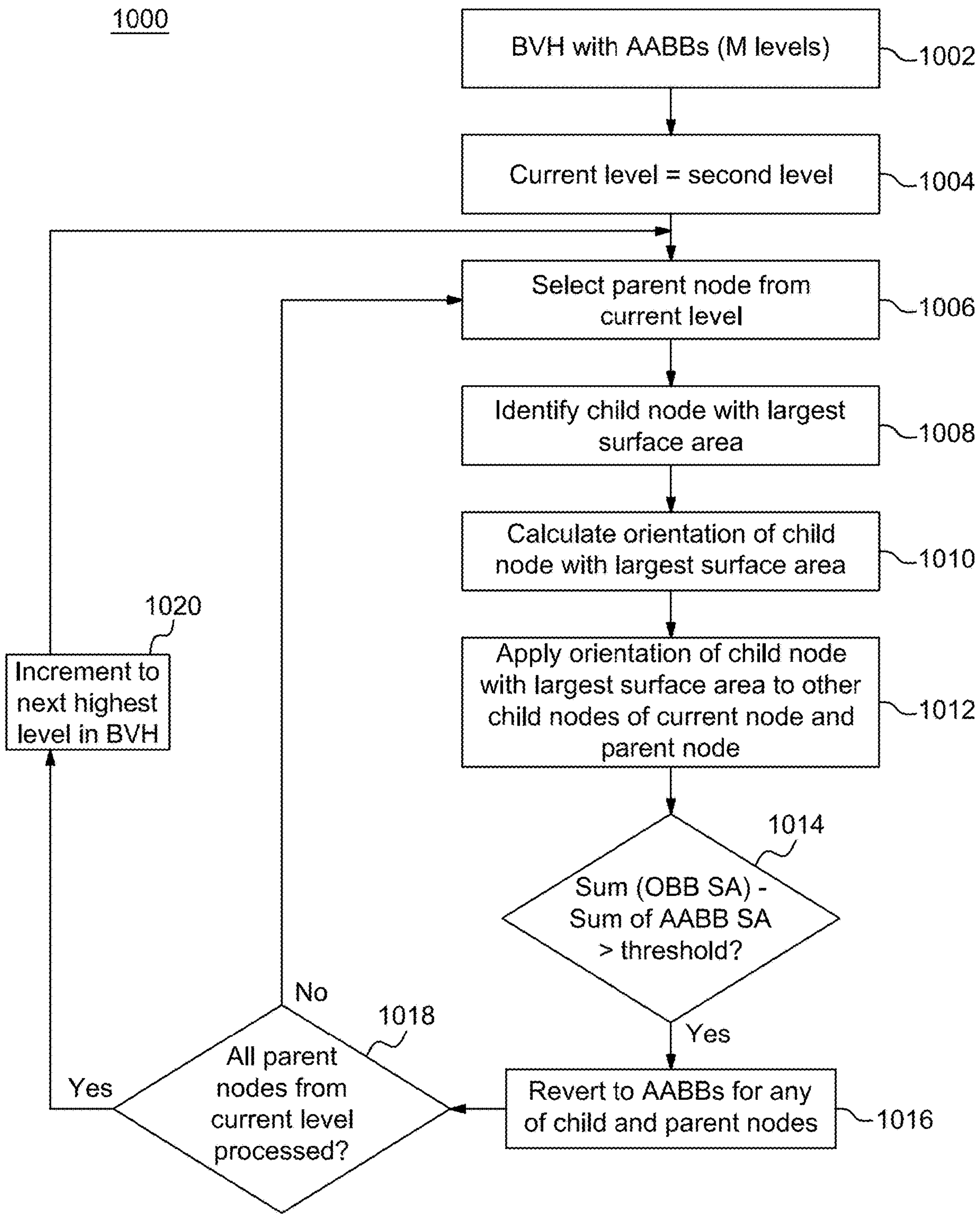
FIG. 10 is a flow diagram illustrating a method for building a bounding volume hierarchy with oriented bounding boxes according to a further example.
Figure 11A:
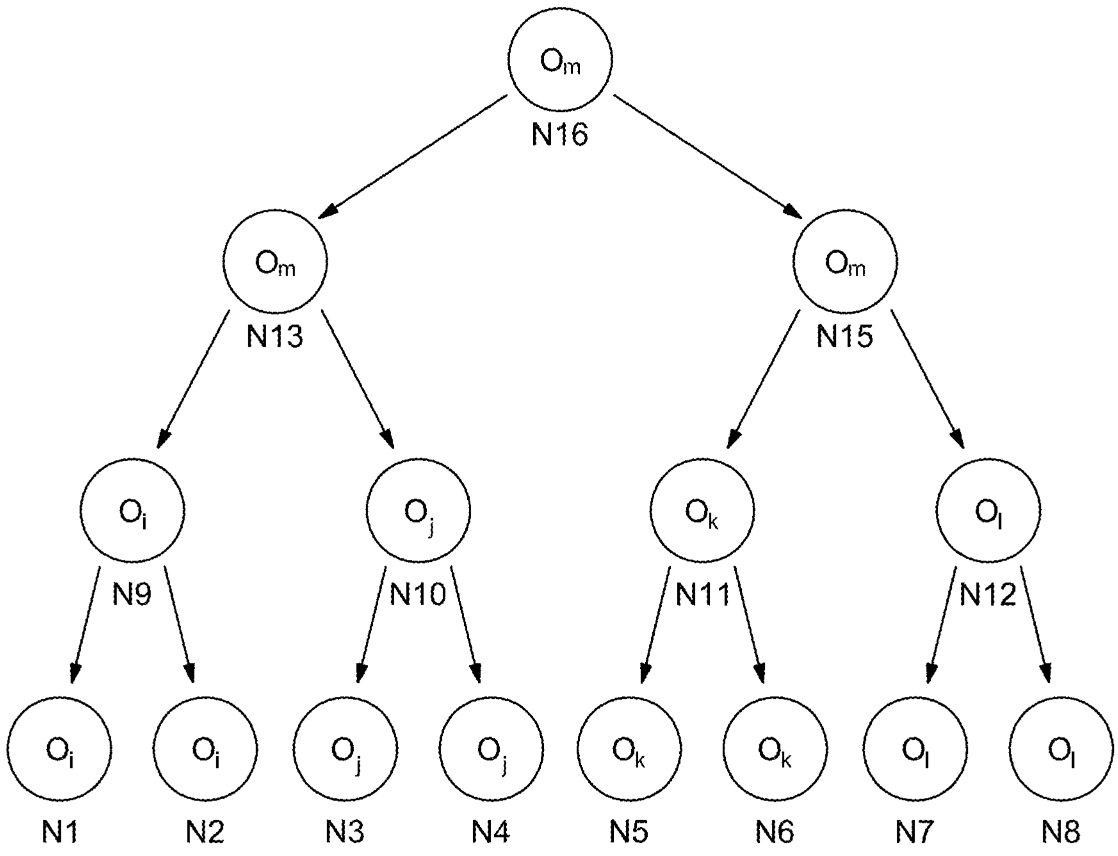
FIGS. 11A-11B illustrate examples of bounding volume hierarchies built using techniques described herein.
Figure 11B:
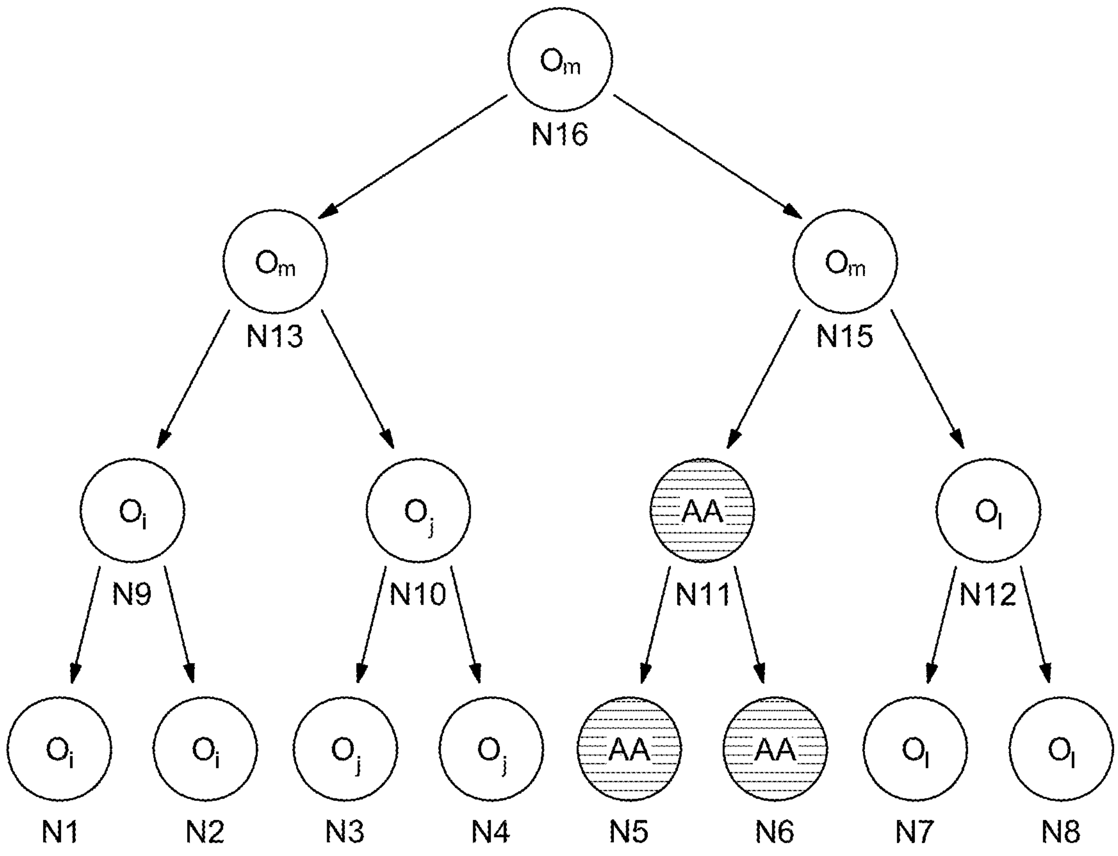
Figure 12:
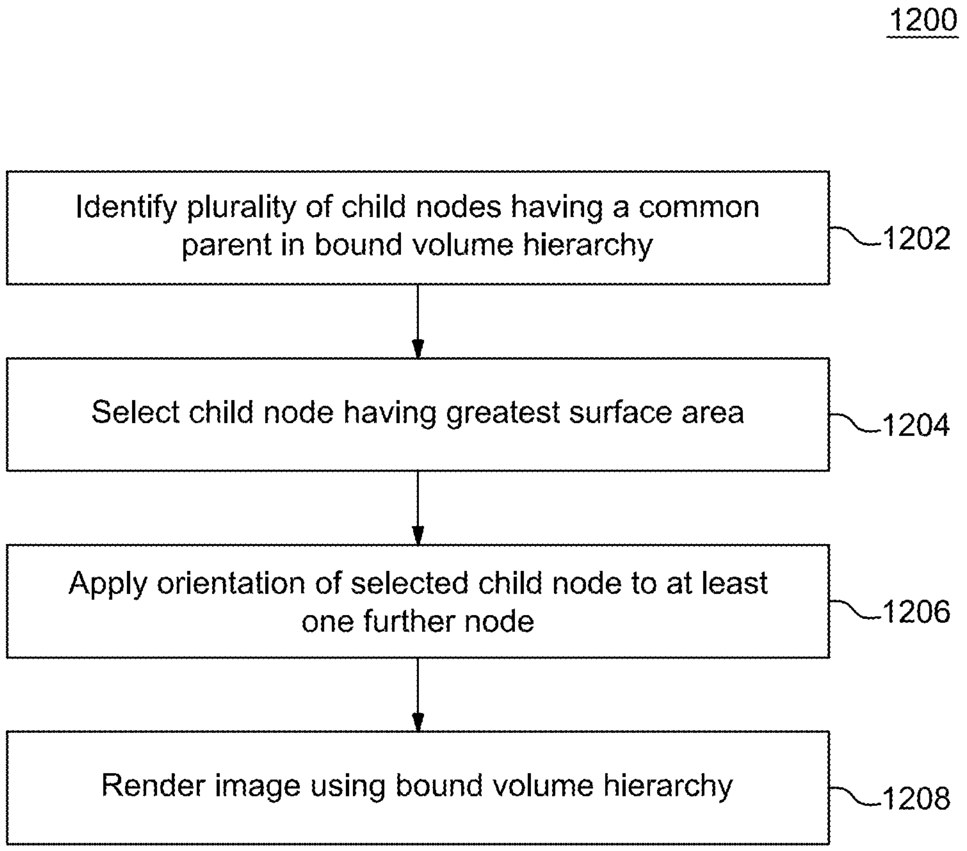
FIG. 12 is a flow diagram illustrating a method for building a bounding volume hierarchy with oriented bounding boxes according to a further example.

In the present disclosure, FIGS. 1-4 provide background for ray tracing. FIG. 5 illustrates oriented bounding boxes. FIG. 6 illustrates a technique for determining an orientation for a triangle. FIGS. 7A-7B together with FIG. 8 illustrate an exemplary method for building a bounding volume hierarchy with OBBs according to an example. FIGS. 9A-9F together with FIG. 10 illustrate an exemplary method for building a bounding volume hierarchy with OBBs according to a further example. FIGS. 11A-11B illustrate exemplary hierarchies built uses the techniques described herein. FIG. 12 illustrates a flow diagram for building a bounding volume hierarchy with OBBs.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a display connector/interface (e.g., an HDMI or DisplayPort connector or interface for connecting to an HDMI or Display Port compliant device), a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a parallel processing paradigm, such as a single-instruction-multiple-data ("SIMD") paradigm or a single-instruction-multiple-threads ("SIMT"). Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a parallel processing paradigm may perform the functionality described herein. Alternatively, it is contemplated that computing systems that do not perform processing tasks in accordance with a parallel processing paradigm can also perform the functionality described herein.

Figure 2:
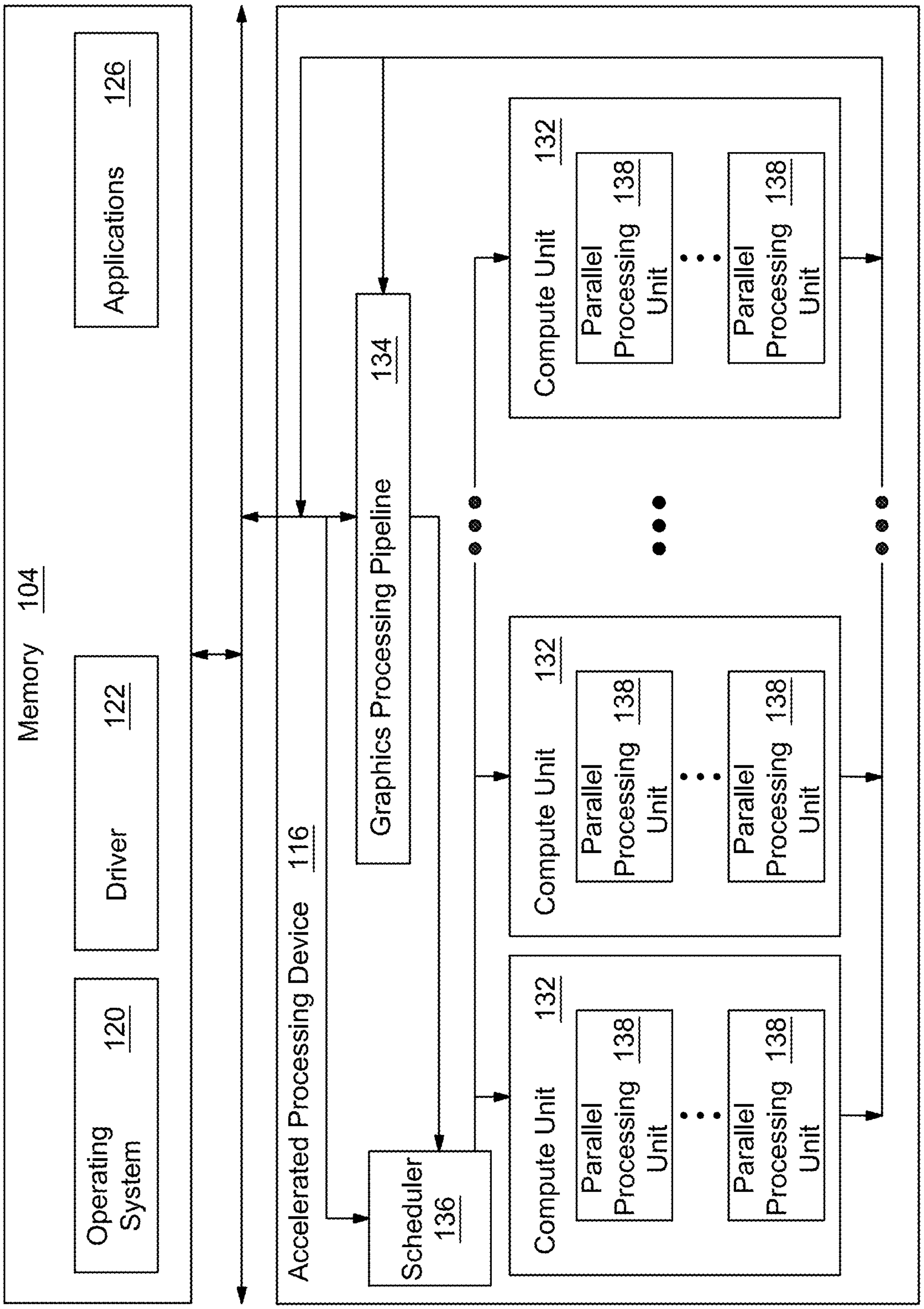
FIG. 2 illustrates details of the device of FIG. 1, illustrating additional detail.

FIG. 2 is a block diagram of aspects of device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the parallel processing units 138 discussed in further detail below) of the APD 116.

The APD 116 executes commands and programs for selected functions, such as graphics operations and non-graphics operations that are or can be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more parallel processing unit 138 that perform operations at the request of the processor 102 in a parallel manner according to a parallel processing paradigm, such as SIMD or SIMT. In such paradigms, multiple processing elements execute the same instruction across multiple data elements or threads. The multiple processing elements share a single program control flow unit and program counter and thus execute the same program but are able to execute that program with or using different data. In one example, each parallel processing unit 138 includes sixteen lanes, where each lane executes the same instruction at the same time as the other lanes in the parallel processing unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program or kernel that is to be executed in parallel according to the parallel processing paradigm employed. For example, in a SIMD architecture, multiple work-items execute the same instruction simultaneously on different data elements. Work-items can be executed simultaneously as a "wavefront" on a parallel processing unit 138, where each work-item executes the same instruction with different data and where different work-items can execute a different control flow path through the use of predication. In a SIMT architecture, work-items correspond to threads that can be executed simultaneously on the parallel processing unit 138, where different threads can execute different control flow paths. Threads are grouped into "warps" or "wavefronts", which are scheduled or executed together.

For the purposes of this description, the term "wavefront" will be used, but it should be understood that this term broadly describes work-items that can be executed simultaneously and is inclusive of both "wavefronts" and "warps. One or more wavefronts are included in a "work group," which includes a collection of work-items designated to execute the same program. A work group can be executed by executing each of the wavefronts that make up the work group. In alternatives, the wavefronts are executed sequentially on a single parallel processing unit 138 or partially or fully in parallel on different parallel processing unit 138. Wavefronts can be thought of as the largest collection of work-items that can be executed simultaneously on a single parallel processing unit 138. Thus, if commands received from the processor 102 indicate that a particular program is to be parallelized to such a degree that the program cannot execute on a single parallel processing unit 138 simultaneously, then that program is broken up into wavefronts which are parallelized on two or more parallel processing units 138 or serialized on the same parallel processing unit 138 (or both parallelized and serialized as needed). A scheduler 136 performs operations related to scheduling various wavefronts on different compute units 132 and parallel processing units 138.

The parallelism afforded by the compute units 132 is suitable for graphics related operations such as pixel value calculations, vertex transformations, and other graphics operations and non-graphics operations (sometimes known as "compute" operations). Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
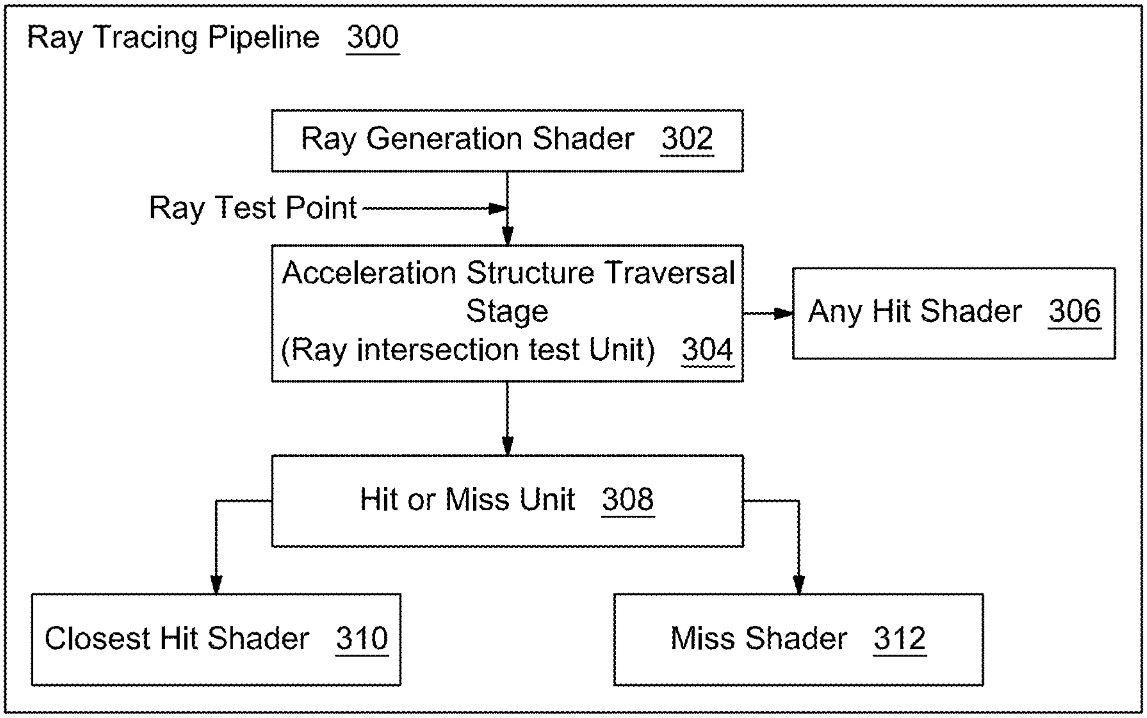
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes logical stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives and generated upstream. Rasterization includes determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents a bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent bounding boxes that subdivide the space of their parents, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against the bounding boxes, followed by tests against triangles.

Figure 4:
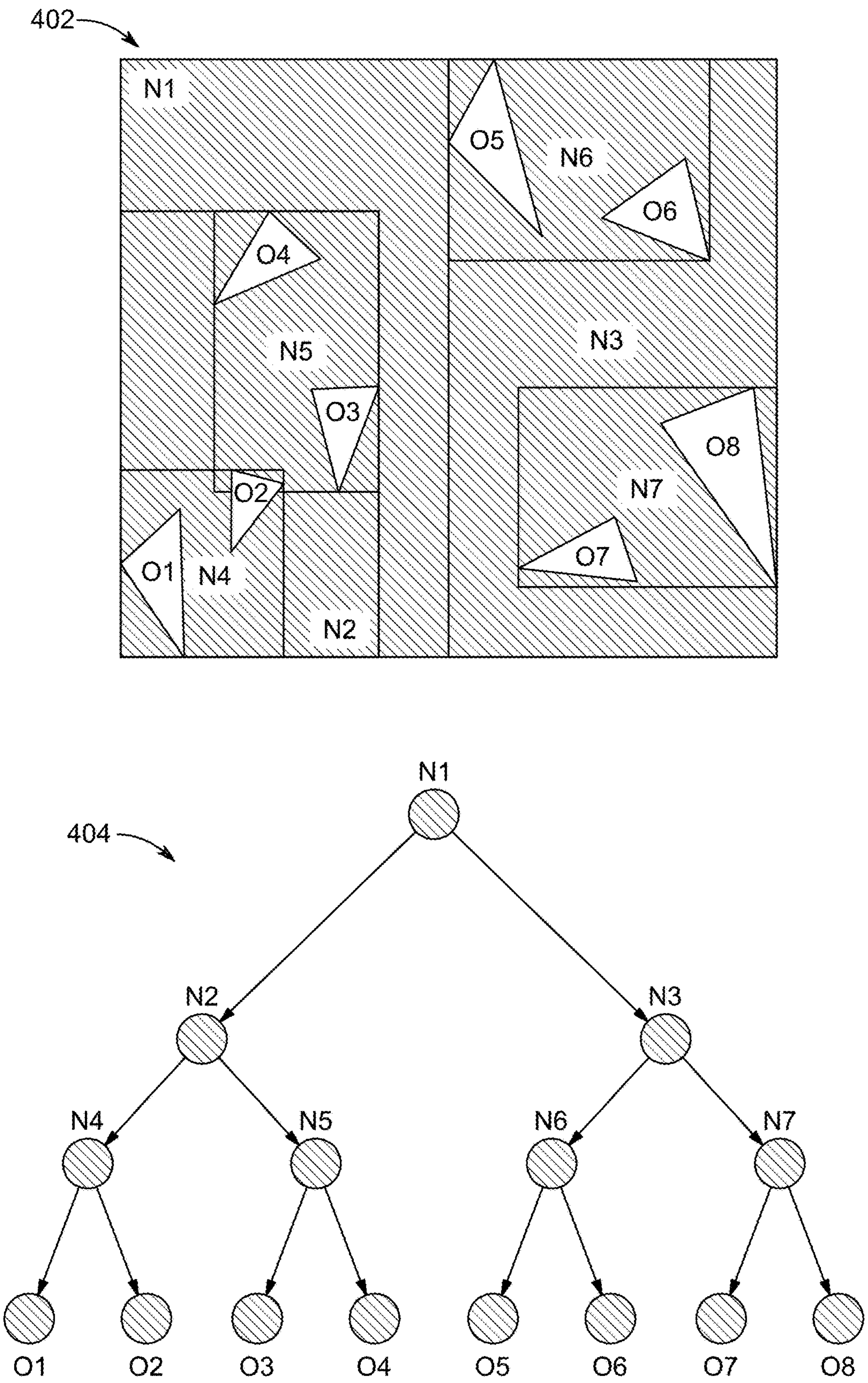
FIG. 4 illustrates a bounding volume hierarchy according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

As described above, non-leaf nodes (e.g., nodes labeled "N") of a bounding volume hierarchy include a bounding volume that bounds the contents of the descendants of that non-leaf node (which are called "underlying geometry"). A simple implementation uses axis-aligned bounding boxes as these bounding volumes, where the faces of such bounding boxes are parallel with the axes (e.g., x, y, and z) of the coordinate space. However, it is advantageous to use oriented bounding boxes, which are bounding boxes having faces that are not necessarily aligned with the axes.

FIG. 5 illustrates an example oriented bounding box. More specifically, FIG. 5 illustrates a comparison between an axis-aligned bounding box 504 and an oriented bounding box 506, both of which bound example underlying geometry of one triangle 502. With the axis-aligned bounding box 504, that bounding box bounds the triangle 502, but has a considerable amount of empty space (the space outside of the triangle 502 but within the box 504). This empty space can be considered inefficient, because rays that intersect the box within that empty space will cause the ray tracing pipeline 300 to further traverse the descendants of the associated non-leaf node, but will ultimately result in no intersection for any such descendant. An intersection with a bounding box that does not intersect any underlying geometry is sometimes referred to herein as a "false positive." Because the role of a non-leaf node is to eliminate geometry from consideration as early as possible, bounding volumes with a considerable amount of empty space are considered inefficient. By orienting bounding boxes, as shown with oriented bounding box 506, the bounding volumes can be made to more tightly fit the underlying geometry, resulting in fewer false positives and thus more efficient operation. In various examples, a bounding volume hierarchy includes oriented bounding boxes as appropriate to reduce the false positives that would occur with exclusive use of axis-aligned bounding boxes during ray tracing.

FIG. 6 illustrates an exemplary technique for determining the orientation of a triangle 600, having sides 600_a_, 600_b_ and 600_c_. The technique shown in FIG. 6 can be applied to identify an orientation for a bounding volume for a triangle of a leaf node in a bounding volume hierarchy. Referring to FIG. 6, three candidate oriented bounding boxes 602, 604 and 606 are shown for triangle 600. Each candidate bounding box has a different orientation, and corresponds to a rectangle having one side aligned with a different side of triangle 600. Specifically, candidate bounding box 602 has a side aligned with side 600_a_ of triangle 600; candidate bounding box 604 has a side aligned with side 600_b_ of triangle 600; and candidate bounding box 606 has a side aligned with side 600_a_ of triangle 600. Subject to the constraint that it has one side aligned with one of sides 600_a_, 600_b_ or 600_c_ of triangle 600, each candidate bounding box 602, 604, 606 is dimensioned to tightly include triangle 600 within the candidate bounding box. To select an orientation for the bounding volume for a triangle 600, the surface areas of candidate bounding boxes 602, 604 and 606 are compared, and the orientation of the candidate bounding box having the smallest surface area is selected as the orientation for the bounding volume for the triangle 600. In other embodiments, only one side of a triangle is used to compute the OBB as opposed to computing 3 OBBs and selecting the smallest one.

It should be understood that although 2D boxes are illustrated in FIG. 6, in some examples, the measure used to determine which orientation to use is the total surface area of a bounding volume that bounds the triangle in 3D space.

A leaf node may contain multiple triangles, in which case the technique of FIG. 6 is performed for each such triangle. The orientation is then determined for the leaf node as the orientation of the triangle whose bounding volume has the largest total surface area (sum of areas of each side).

As stated above, a bounding volume hierarchy is traversed to render a scene. Oriented bounding boxes improve performance of such traversal, but have in the past been computationally expensive to build. FIGS. 7A and 7B illustrate a technique for building a bounding volume hierarchy of oriented bounding boxes, which is significantly less expensive to build than earlier techniques. Referring first to FIG. 7A, an exemplary bounding volume hierarchy with fifteen nodes (N1-N15) is shown. Leaf nodes N1-N8 each have an associated oriented bounding box (denoted using the symbol "O"), where the orientation for each oriented bounding box was determined, for example, using the technique described above in connection with FIG. 6. In the example shown, each leaf node N1-N8 has a different orientation, as denoted by the different subscripts for each oriented bounding box ($O_i$ . . . $O_p$). Also in FIG. 7A, nodes N9-N15 each initially has an axis-aligned bounding box (denoted using the symbol "AA"). In order to identify an orientation for each node N9-N15, the system compares the total surface areas (e.g., the sum of the surface areas of each face of the bounding volume) of the bounding volume of each child node of a parent node, and applies the orientation of the child node with the largest total surface area to the sibling(s) of that child node and the parent node. An exemplary result of the application of this technique to bounding volume hierarchy 700 of FIG. 7A is represented by bounding volume hierarchy 702 shown in FIG. 7B.

As illustrated by the exemplary result shown in FIG. 7B, the total surface area of the bounding volume of node N2 was compared against that of node N1 and the total surface area of N2 was found to be greater than that of node N1. Note that in the example shown, each leaf node has one or more triangles. If such a leaf node has more than one triangle, then the orientation of the bounding volume of the leaf node would be the orientation for the bounding volume of the triangle with the largest total surface area. If the leaf node has only one triangle, then the bounding volume for the leaf node has the orientation of the bounding volume for the triangle. As a result, the orientation of node N2 (i.e., $O_j$) was applied to parent node N9 and to N1. A similar process was performed to identify the orientation for nodes N10, N11 and N12. More specifically, for node N10, the system compared the total surface areas for the bounding volume of the child nodes N3 and N4 of parent node N10. The surface area of node N3 was greater than the surface area of node N4 and, as a result, the orientation of node N3 (i.e., $O_k$) was applied to parent node N10 and to N4. For node N11, the system compared the surface areas of the child nodes N5 and N6 of parent node N11. The surface area of node N5 was greater than the surface area of node N6 and, as a result, the orientation of node N6 (i.e., $O_m$) was applied to parent node N11 and sibling node N5. For node N12, the system compared the surface areas of the child nodes N7 and N8 of parent node N12. The surface area of node N8 was greater than the surface area of node N7 and, as a result, the orientation of node N8 (i.e., $O_p$) was applied to parent node N12 and sibling node N7.

Next, the same process described above was applied to the next highest level in the hierarchy (i.e., nodes N13 and N14). In the example shown, for node N13, the system compared the total surface areas of the child nodes N9 and N10 of parent node N13. The surface area of node N10 was greater than the surface area of node N9 and, as a result, the orientation of node N10 (i.e., $O_k$) was applied to parent node N13 and sibling node N9. For node N14, the system compared the surface areas of the child nodes N11 and N12. The surface area of node N12 was greater than the surface area of node N11 and, as a result, the orientation of node N12 (i.e., $O_p$) was applied to parent node N14 and to sibling node N11.

Lastly, the same process described above was applied to the highest level in the hierarchy (i.e., node N15) by comparing the surface areas of the child nodes N13 and N14 of parent node N15. The surface area of node N14 was greater than the surface area of node N13 and, as a result, the orientation of node N14 (i.e., $O_p$) was applied to parent node N15 and to sibling node N13.

FIG. 8 is a flow diagram illustrating a method 800 for building a bounding volume hierarchy with oriented bounding boxes according to an example. The method illustrated in FIG. 8 corresponds to the example described above in connection with FIGS. 7A and 7B. The process begins at step 802 with a bounding volume hierarchy such as that shown in FIG. 7A, where orientations have been calculated for each of the leaf nodes. In some examples, the technique described in connection with FIG. 6 is used to determine the orientations for the leaf nodes. It will be understood that other techniques for calculating orientations for the leaf nodes are used in other examples of method 800. In step 804, the level of the bounding volume hierarchy above the leaf nodes (referred to as the "second" level in the figure) is selected for processing, and in step 806 a parent node (e.g., a node in that level having children) in that level is selected. In step 808, the child of the selected parent node having the greatest total surface area is identified (that is, the greatest out of all children of the selected parent node), and the orientation of that child node is applied to the selected parent node and to the siblings of that child node. Step 812 indicates that the process of steps 808-810 is repeated for all parent nodes in a given level of the hierarchy, and, as shown in step 814, the process is applied to the next highest level in the hierarchy. In the example shown, processing continues until all nodes in the hierarchy have been processed.

Figure 9A:
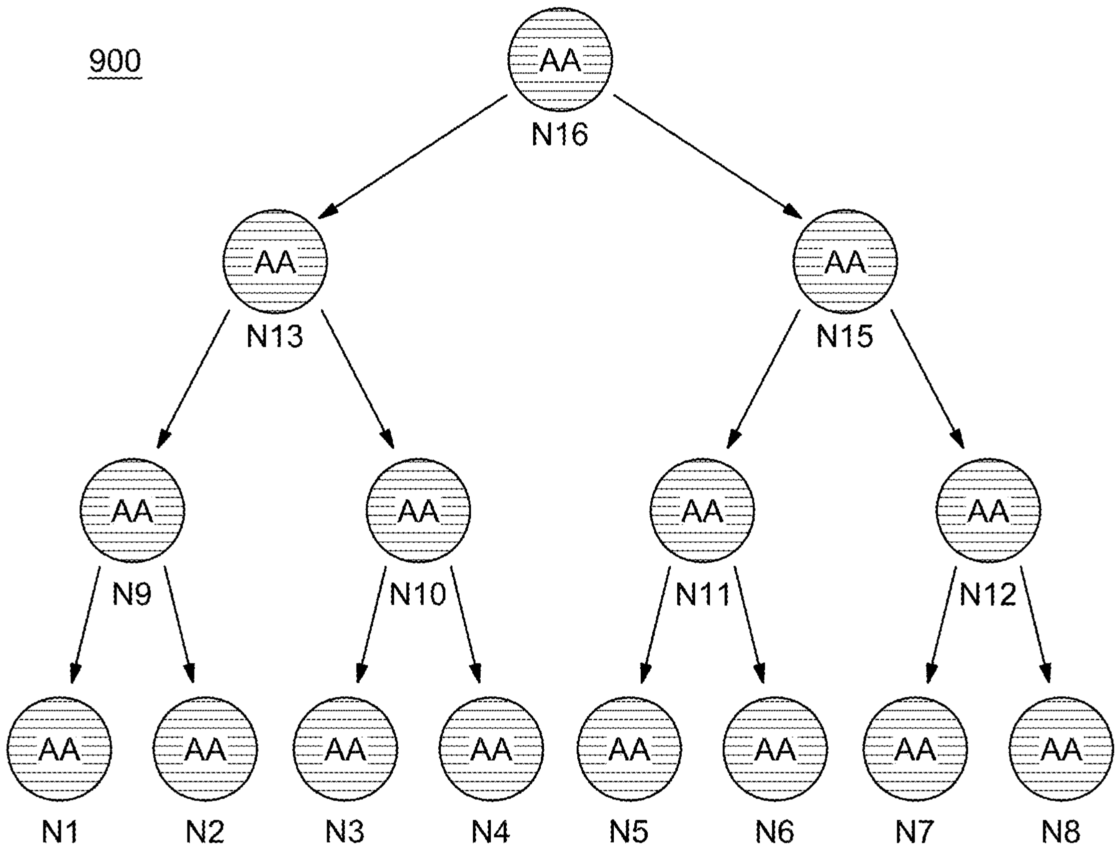
FIGS. 9A-9F illustrate aspects of a technique for building a bounding volume hierarchy with oriented bounding boxes, according to a further example.

FIGS. 9A-9F illustrate aspects of a technique for building a bounding volume hierarchy with oriented bounding boxes, according to a further example. The technique for computing oriented bounding boxes illustrated in FIGS. 9A-9F is also significantly less expensive than earlier techniques. Referring first to FIG. 9A, an exemplary bounding volume hierarchy 900 with fifteen nodes (N1-N15) is shown. Each node N1-N15 initially has an associated axis-aligned bounding box (denoted using the symbol "AA"). In contrast to the example of FIGS. 7A-7B, the leaf nodes in bounding volume hierarchy 900 begin as axis-aligned bounding boxes and are converted to oriented bounding boxes as part of the processing of the bounding volume hierarchy.

Figure 9B:
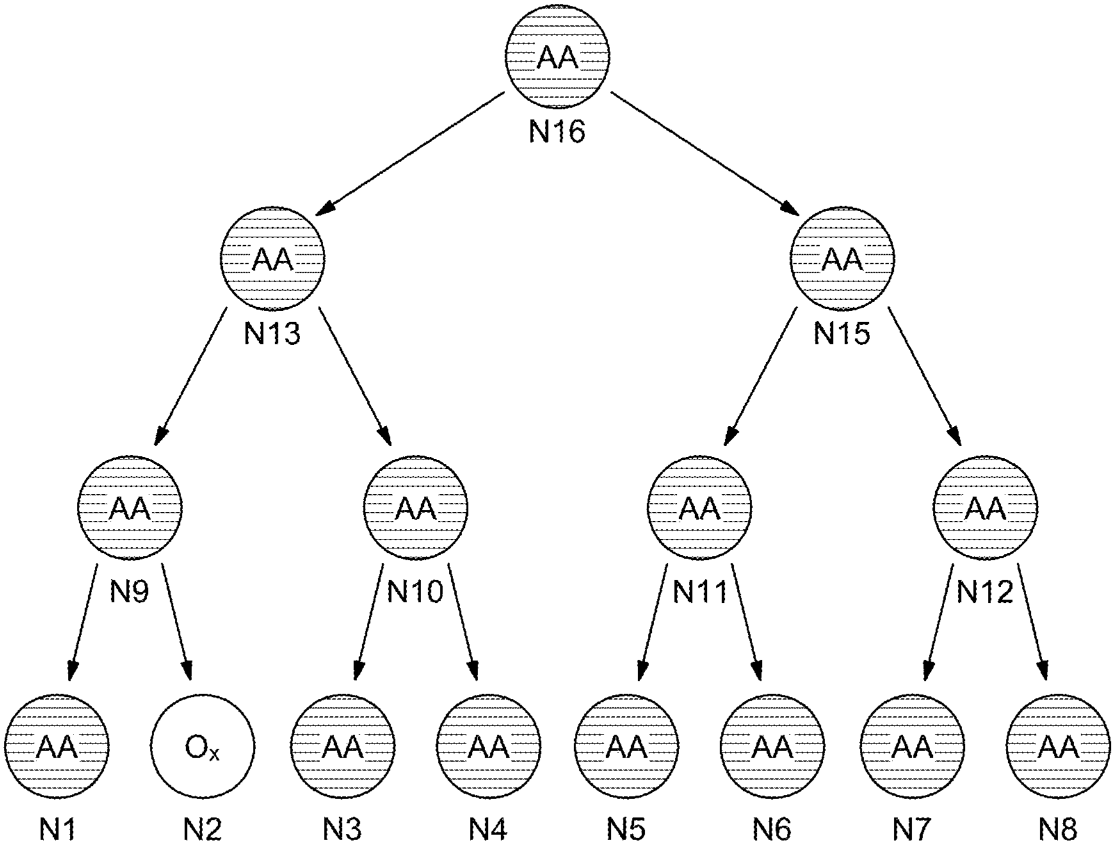
Figure 9C:
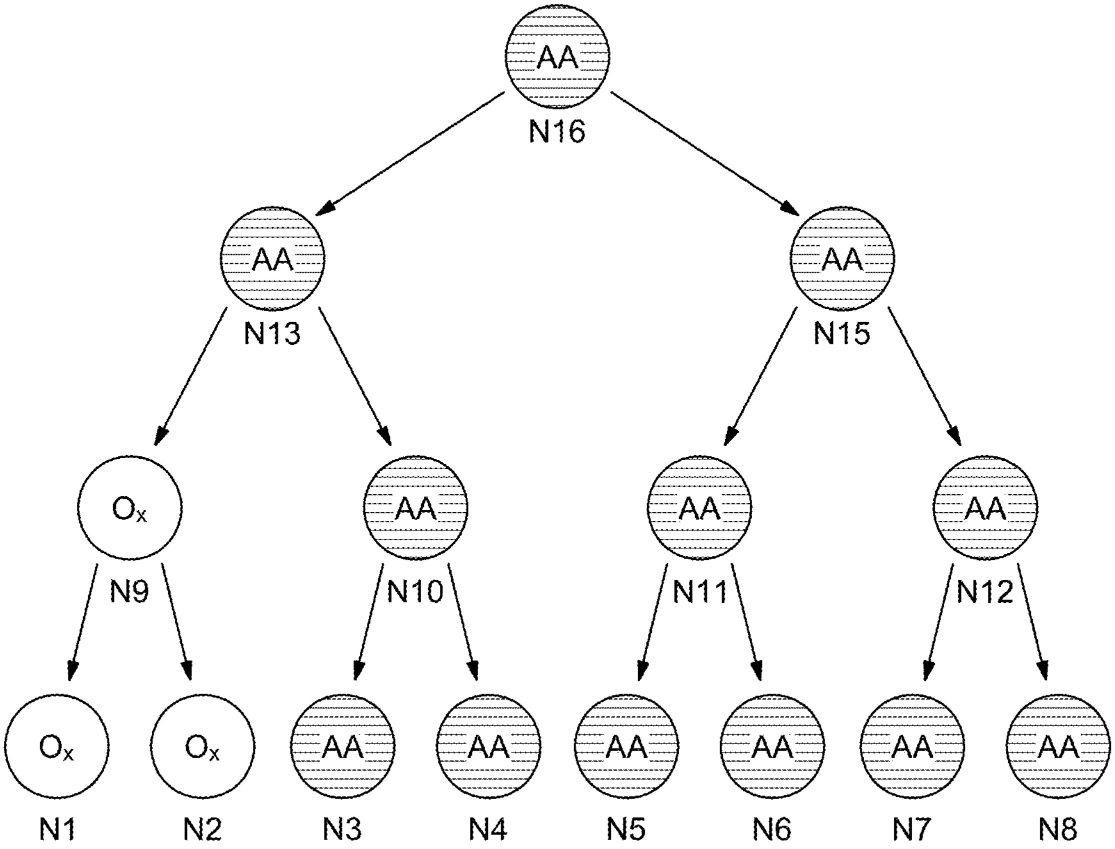

The example of FIGS. 9A-9F begins by selecting parent node N9 for processing. Initially, the system compares the total surface areas of the axis-aligned child nodes N1 and N2 of parent node N9, and selects the child node with the greatest total surface area. Referring now to FIG. 9B, in the example shown axis-aligned child node N2 has a greater total surface area than that of node N1, and therefore node N2 is selected. Next, an orientation for N2 is determined using, for example, the techniques described above in connection with FIG. 6. In FIG. 9B, the orientation of node N2 is denoted with the symbol $O_x$, where the "O" indicates that the node is an oriented node and the subscript indicates a given orientation of the node. Next, as shown in FIG. 9C, the system applies the orientation of the selected child node (N2) to the sibling(s) of N2 (namely, N1) and the parent of N2, namely N9. As a result, the same orientation (denoted by the subscript "x" in the symbol $O_x$) is used for building the oriented bounding boxes of both the parent node N9 and its children N1, N2.

Referring now to FIGS. 9A and 9C, in some examples, after bounding boxes for nodes N1, N2 and N9 are converted from axis-aligned bounding boxes to oriented bounding boxes, the system compares a first sum of the surface areas of the axis-aligned bounding boxes corresponding to N1, N2 and N9 (as shown in FIG. 9A) with a second sum of the surface areas of the oriented bounding boxes corresponding to N1, N2 and N9 (as shown in FIG. 9C). In some such examples, if the second sum exceeds the first sum by more than a threshold, the system reverts to the axis-aligned bounding boxes shown in FIG. 9A for nodes N1, N2 and N9. In other words, if the oriented bounding box determined for the node is actually worse than the axis-aligned bounding box by more than a threshold, then the axis-aligned bounding box is used. In the example shown, the second sum does not exceed the first sum by more than the threshold, and as a result, no such reversion occurs. This reversion can be done individually for each node—if the total surface area for the oriented bounding box for any node is greater than the total surface area for the axis-aligned bounding box for that node, then the axis-aligned bounding box is used for that node, and this determination can be made differently for each node.

Figure 9D:
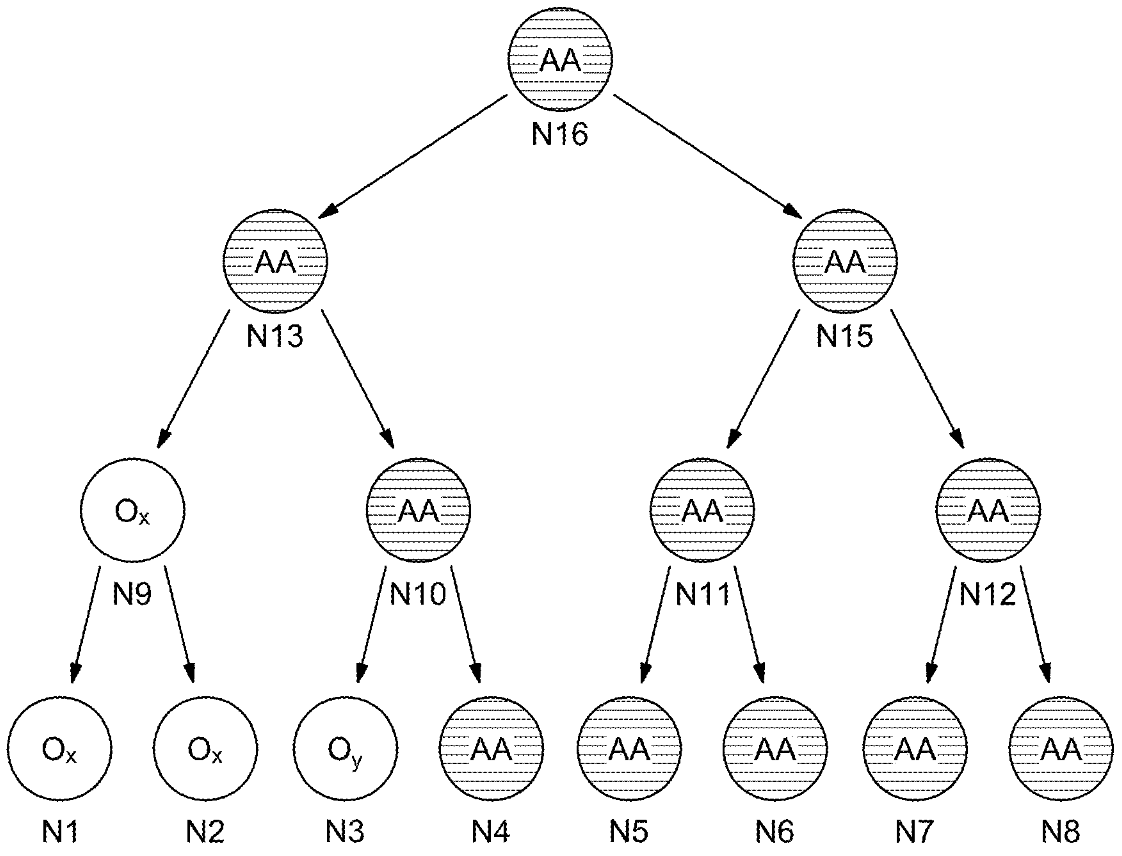
Figure 9E:
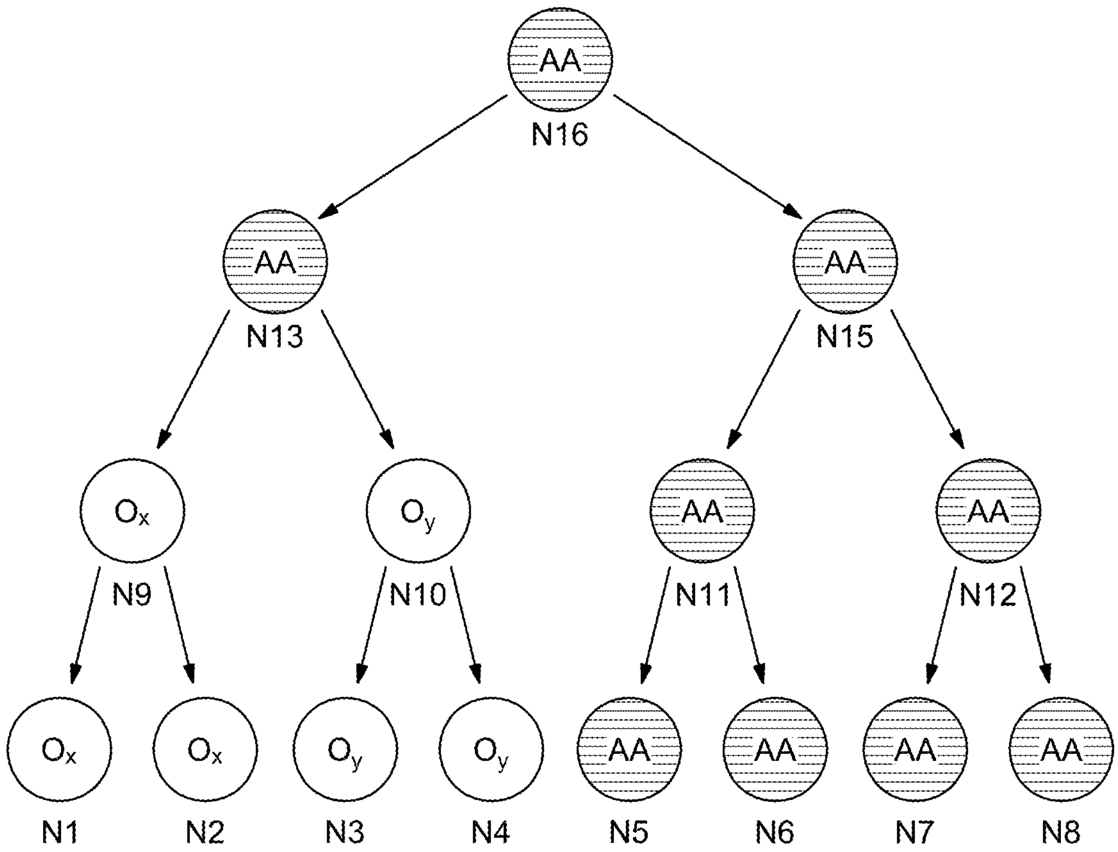

Continuing with the example, the system next compares the total surface areas of the axis-aligned child nodes N3 and N4 of parent node N10, and selects the child node with the total greatest surface area. In the example, axis-aligned child node N3 has a greater total surface area than that of node N4, and therefore node N3 is selected. Next, as illustrated in FIG. 9D, an orientation for N3 is determining using, for example, the techniques described above in connection with FIG. 6. In FIG. 9D, the orientation of node N3 is denoted with the symbol $O_y$, where the "O" indicates that the node is an oriented node and the subscript indicates a given orientation of the node. Next, as shown in FIG. 9E, the system applies the orientation of the selected child node (N3) to the sibling(s) of N3 (namely, N4) and the parent of N3, namely N10. As a result, the same orientation (denoted by the subscript "y" in the symbol $O_y$) is applied to both the parent node N10 and its children N3, N4.

Figure 9F:
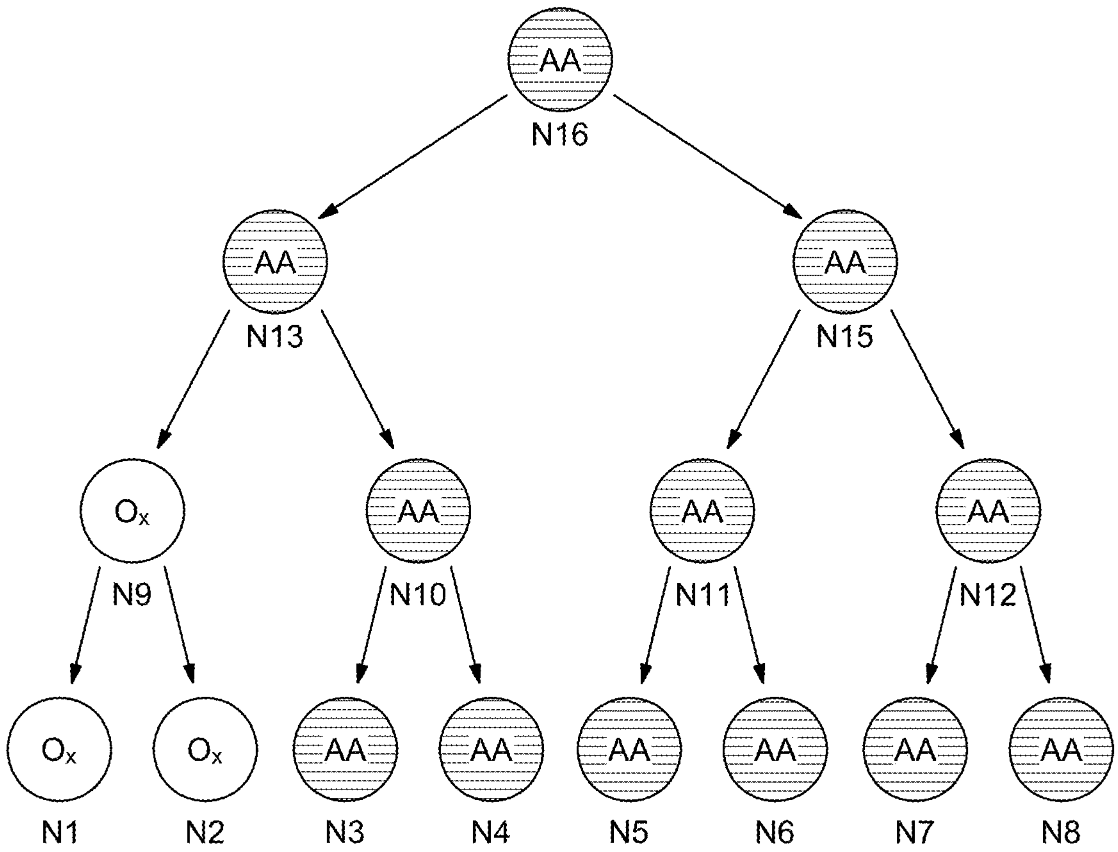

After nodes N3, N4 and N10 are converted from axis-aligned bounding boxes to oriented bounding boxes, the system compares a first sum of the surface areas of the axis-aligned bounding boxes corresponding to N3, N4 and N10 (as shown in FIG. 9A) with a second sum of the surface areas of the oriented bounding boxes corresponding to N3, N4 and N10 (as shown in FIG. 9E). In the illustrated example, the second sum exceeds the first sum by more than the threshold, and as a result, the system reverts to the axis-aligned bounding boxes shown in FIG. 9A for nodes N3, N4 and N10, as shown in FIG. 9F.

While not shown in further figures, the example described above in connection with FIGS. 9A-9F continues for the remaining nodes in the hierarchy until all nodes have been processed.

FIG. 10 is a flow diagram illustrating a method 1000 for building a bounding volume hierarchy with oriented bounding boxes according to an example. The method illustrated in FIG. 10 corresponds to the example described above in connection with FIGS. 9A-9F. The process begins at step 1002 with a bounding volume hierarchy where all nodes having bounding boxes that are axis-aligned. In step 1004, the level of the bounding volume hierarchy above the leaf nodes (referred to as the "second" level in the figure) is selected for processing, and in step 1006 a parent node in that level is selected. In step 1008, the child of the selected parent node having the greatest total surface area is identified, and the orientation of that child node is calculated (step 1010) using, for example, the techniques described above in connection with FIG. 6. In step 1012, the calculated orientation for the selected child node is applied to the sibling(s) of the child node and the selected parent node. In step 1014, the total surface area of each oriented bounding box is compared to the total surface area of each axis aligned bounding box. For any node where the total surface area of an oriented bounding box is greater than that for the axis-aligned bounding box by more than a threshold, in step 1016 the system reverts to the axis-aligned bounding box for that node. Step 1018 indicates that the process of steps 1008-1014 is repeated for all parent nodes in a given level of the hierarchy, after which, as shown in step 1020, the process is applied to the next highest level in the hierarchy. In the example shown, processing continues until all nodes in the hierarchy have been processed.

FIGS. 11A and 11B represent examples of bounding volume hierarchies resulting from application of method 1000. In the example shown in FIG. 11A, no iterations of step 1014 resulted in reversion of any of the oriented bounding boxes back to axis-aligned bounding boxes. As a result, all nodes in the hierarchy are represented as oriented nodes. By contrast, in the example shown in FIG. 11B, one iteration of step 1014 resulted in the reversion of nodes N5, N6 and N11 from oriented bounding boxes back to axis-aligned bounding boxes. As a result, the hierarchy in FIG. 11B is represented by a combination of oriented nodes and axis aligned nodes.

While the examples set forth above depict binary trees, it will be understood by those skilled in the art that the techniques described herein are applicable to n-ary trees as well.

FIG. 12 is a flow diagram of a method 1200 for generating a bounding volume hierarchy with OBBs, according to an example. Although described with respect to the system of FIGS. 1-11, those of skill in the art will recognize that any system configured to perform the steps of the method 1200 in any technically feasible order falls within the scope of the present disclosure. In some examples, method 1200 is applied to a bounding volume hierarchy where initially the leaf nodes have oriented bounding volumes, and all other nodes have axis-aligned bounding volumes. The orientations of such leaf nodes are determined using the techniques described herein (in connection with FIG. 6) or using other suitable techniques. In other examples, method 1200 is applied to a bounding volume hierarchy where all nodes initially have axis-aligned bounding volumes. In some examples, method 1200 is performed as a post-processing step after all or part of the BVH is built, while in other examples method 1200 is applied to a partially-built BVH. For example, if the BVH builder is a bottom-up builder, the conversion to OBBs using method 1200 can be computed for lower levels of the BVH that have been built even though upper levels of the BVH have not yet been built.

In step 1202, the system identifies a plurality of child nodes having a common parent node in the bounding volume hierarchy. Any technically feasible technique may be used to identify the plurality of child nodes having a common parent node in the bounding volume hierarchy.

In step 1204, the system selects, from the plurality of child nodes, the child node having the greatest total surface area. Any technically feasible technique for performing such selection can be used.

In step 1206, the system applies the orientation of the selected child node to at least one further node. In some examples, the system applies the orientation for the selected child node to the parent node. In other examples, the system applies the orientation for the selected child node to each other child node of the plurality of child nodes, as well as to the parent node. In some examples, the system compares the total surface area of an axis-aligned bounding box for a node against the total surface area of the determined oriented bounding box for that node. In some examples, where the total surface area of the oriented bounding box is greater than the total surface area of the axis-aligned bounding box by at least a threshold amount for a given node, the node reverts to an axis aligned bounding box. In some examples, steps 1202-1206 are repeated until all nodes in the bounding volume hierarchy have been processed.

In step 1208, the system renders an image using the bounding volume hierarchy. Any technically feasible technique for performing such rendering can be used.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the parallel processing units 138) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:

identifying a plurality of child nodes having a common parent node in a bounding volume hierarchy;

selecting a child node from the plurality of child nodes by identifying a child node having a greatest total surface area;

applying an orientation of the selected child node to at least one further node, wherein the at least one further node includes at least one of another child node from the plurality of child nodes and the common parent node; and rendering an image using the bounding volume hierarchy after applying the orientation of the selected child node to the at least one further node.

2. The method of claim 1, further comprising:

applying the orientation for the selected child node to the common parent node.

3. The method of claim 1, further comprising:

applying the orientation for the selected child node to each other child node of the plurality of child nodes.

4. The method of claim 2, wherein the bounding volume hierarchy comprises leaf nodes each of which includes an oriented bounding box, and each child node of the plurality of child nodes comprises one of the leaf nodes.

5. The method of claim 1, wherein the plurality of child nodes resulting from the identifying each has an axis-aligned bounding box in the bounding volume hierarchy, and the bound volume hierarchy comprises an axis-aligned bound volume hierarchy, the method further comprising:

replacing the axis-aligned bounding volume for the selected child node with an oriented bounding box in the bounding volume hierarchy by calculating an orientation for the selected child node.

6. The method of claim 5, further comprising:

reverting to using an axis-aligned bounding volume for the selected child node in response to comparing a total area of the oriented bounding box with a total area of the axis-aligned bounding volume.

7. The method of claim 5, further comprising maintaining the oriented bounding box for a different child node in response to second comparing of a total area of an oriented bounding box for the different child node with a total area of an axis-aligned bounding box for the different child node.

8. The method of claim 6, wherein the comparing comprises determining that the total area of the oriented bounding box is greater than the total area of the axis-aligned bounding volume by more than a threshold.

9. The method of claim 1, wherein the common parent node is at a first level in the bounding volume hierarchy, and one or more other parent nodes are at the first level in the bounding volume hierarchy, wherein the method further comprises:

processing each other parent node at the first level by:

identifying a plurality of other child nodes for the other parent node;

selecting a child node from the plurality of other child nodes by identifying a child node having a greatest total surface area;

applying an orientation of the selected child node from the plurality of other child nodes to each other child node from the plurality of other child nodes; and repeating said processing for a plurality of further levels in the bounding volume hierarchy until all nodes in the bounding volume hierarchy have been processed.

10. A system comprising:

a memory configured to store a bounding volume hierarchy; and a processor configured to perform operations comprising:

identifying a plurality of child nodes having a common parent node in a bounding volume hierarchy;

selecting a child node from the plurality of child nodes by identifying a child node having a greatest total surface area;

applying an orientation of the selected child node to at least one further node, wherein the at least one further node includes at least one of another child node from the plurality of child nodes and the common parent node; and rendering an image using the bounding volume hierarchy after applying the orientation of the selected child node to the at least one further node.

11. The system of claim 10, wherein the processor is further configured to apply the orientation for the selected child node to the common parent node.

12. The system of claim 10, wherein the processor is further configured to apply the orientation for the selected child node to each other child node of the plurality of child nodes.

13. The system of claim 10, wherein the bounding volume hierarchy comprises leaf nodes each of which includes an oriented bounding box, and each child node of the plurality of child nodes comprises one of the leaf nodes.

14. The system of claim 10, wherein the plurality of child nodes resulting from the identifying each has an axis-aligned bounding box in the bounding volume hierarchy, and the bound volume hierarchy comprises an axis-aligned bound volume hierarchy, and the processor is further configured to perform:

replacing the axis-aligned bounding volume for the selected child node with an oriented bounding box in the bounding volume hierarchy by calculating an orientation for the selected child node.

15. The system of claim 14, wherein the processor is further configured to perform the following operations:

reverting to using an axis-aligned bounding volume for the selected child node in response to comparing a total area of the oriented bounding box with a total area of the axis-aligned bounding volume.

16. The system of claim 15, wherein the processor is further configured to maintain the oriented bounding box for a different child node in response to second comparing of a total area of an oriented bounding box for the different child node with a total area of an axis-aligned bounding box for the different child node.

17. The system of claim 16, wherein the comparing comprises determining that the total area of the oriented bounding box is greater than the total area of the axis-aligned bounding volume by more than a threshold.

18. A non-transitory computer-readable medium storing instructions that, when executed by a processor, cause the processor to perform operations comprising:

identifying a plurality of child nodes having a common parent node in a bounding volume hierarchy;

selecting a child node from the plurality of child nodes by identifying a child node having a greatest total surface area;

applying an orientation of the selected child node to at least one further node, wherein the at least one further node includes at least one of another child node from the plurality of child nodes and the common parent node; and rendering an image using the bounding volume hierarchy after applying the orientation of the selected child node to each other child node from the plurality of child nodes.

19. The non-transitory computer-readable medium storing instructions of claim 18, wherein said instructions that, when executed by a processor, further cause the processor to apply the orientation for the selected child node to the common parent node.

20. The non-transitory computer-readable medium storing instructions of claim 18, wherein the instructions further cause the processor to apply the orientation for the selected child node to each other child node of the plurality of child nodes.

* * * * *